Figure 1:
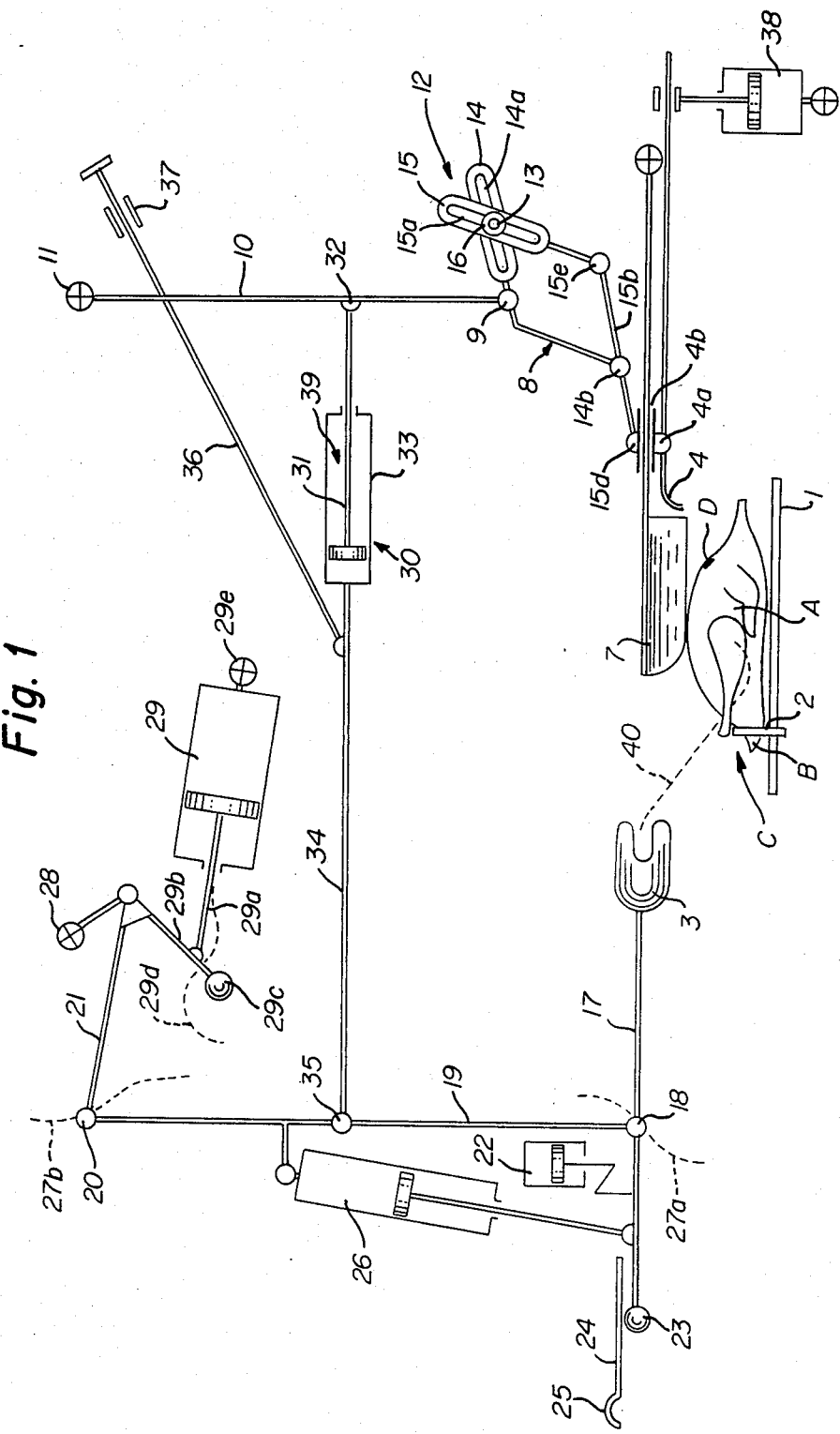

United States Patent [19]

Ullum

[11] Patent Number: 4,527,304
[45] Date of Patent: Jul. 9, 1985

[54] APPARATUS FOR AUTOMATIC CLEANING OF KILLED POULTRY

[76] Inventor: Henrik Ullum, 1 Lykkeholmsallé, DK-2690 Karlslunde, Denmark

[21] Appl. No.: 509,461
[22] PCT Filed: Oct. 21, 1982
[86] PCT No.: PCT/DK82/00096
§ 371 Date: Jun. 9, 1983
§ 102(e) Date: Jun. 9, 1983
[87] PCT Pub. No.: WO83/01367
PCT Pub. Date: Apr. 28, 1983

[30] Foreign Application Priority Data

Oct. 22, 1981 [DK] Denmark .............................. 4677/81

[51] Int. Cl.³ .............................................. A22C 21/06
[52] U.S. Cl. ....................................................... 17/11
[58] Field of Search ....................................... 17/11, 45

[56] References Cited

U.S. PATENT DOCUMENTS 3,750,231 8/1973 Schreuder ................................ 17/11
4,270,242 6/1981 Loth et al. ............................... 17/11

Primary Examiner—Willie G. Abercrombie
Attorney, Agent, or Firm—Biebel, French & Nauman

[57] ABSTRACT

An apparatus for automatic cleaning of killed poultry, particularly broilers, has a support (1) arranged to receive a poultry, a fixing mechanism (2) acting with the support (1) for releasably fixing the poultry in a predetermined position with respect to the support (1), a cleaning tool (3) movable into and out of the abdomen of the poultry body for loosening and extracting intestines and giblets, and a movable sensing means (4) acting with the cleaning tool (3) for indentifying the length of the body. The sensing means (4) is arranged to be moved in a first motion along the neck end of the body into engagement with the collar bone (clavicle) of the body and the cleaning tool (3) is arranged to be moved in a second motion into the body, the total length of both motions being a constant (30). The extent of the cleaning operation is thereby in a simple way adapted to the length of the poultry body.

11 Claims, 2 Drawing Figures

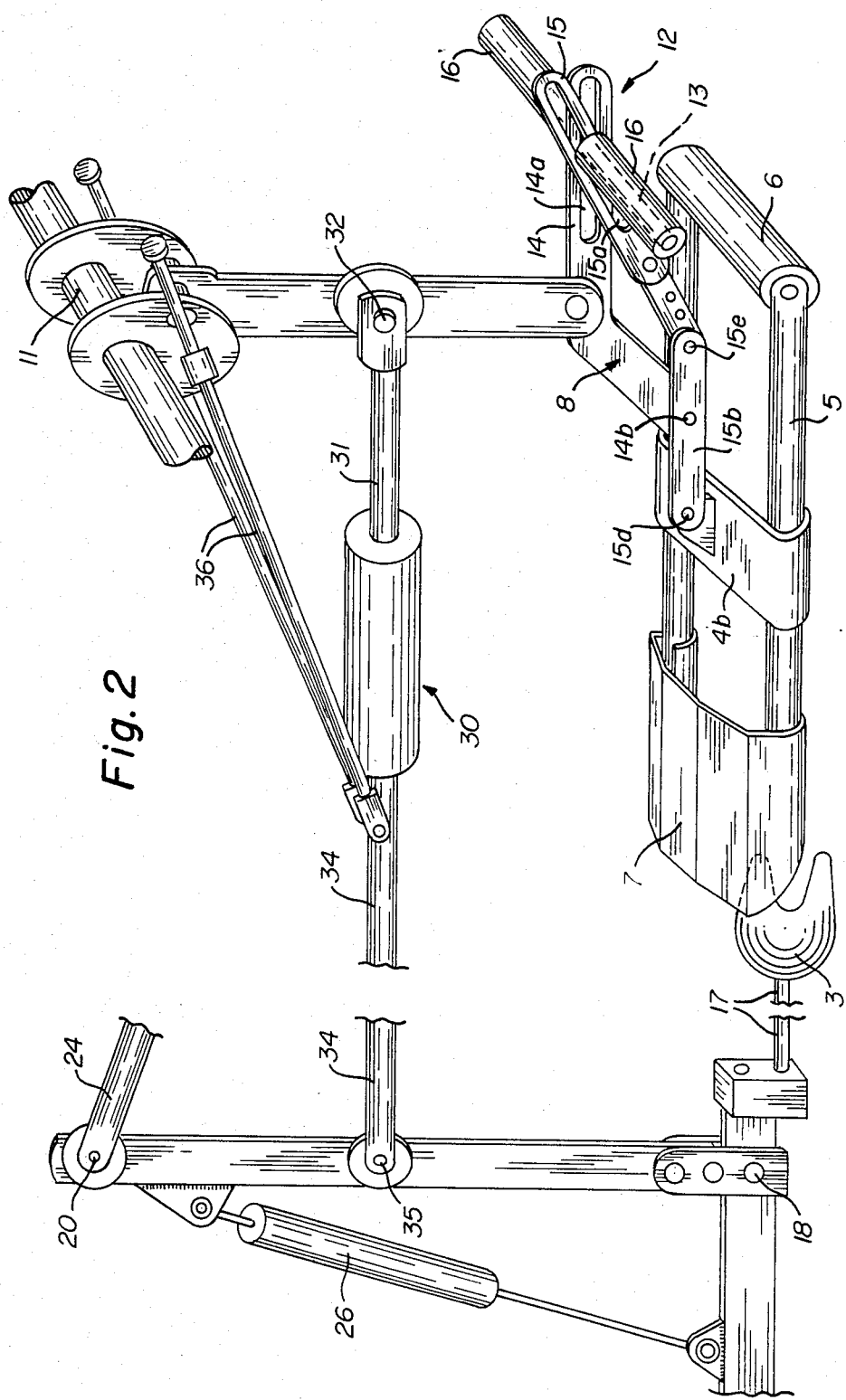

APPARATUS FOR AUTOMATIC CLEANING OF KILLED POULTRY

This invention relates to an apparatus for automatic cleaning of killed poultry, particularly broilers, and having a support arranged to receive a poultry, a fixing mechanism acting with the support for releasably fixing the poultry in a predetermined position with respect to the support, a cleaning tool movable into and out of the abdomen of the poultry body for loosening and extracting intestines and giblets, and a movable sensing means acting with the cleaning tool for identifying the length of the body.

It is the object of the invention to provide an apparatus for rational operation of poultry-sensing and cleaning.

This object is obtainable according to the invention by the sensing means being arranged to be moved in a first motion along the neck end of the body into engagement with the collar bone of the body, the cleaning tool being arranged to be moved in a second motion into the body and the total length of both motions being a constant.

This means that the sensing and the introduction of the cleaning tool are conducted from their respective ends of the poultry body immediately responsive to each other and, as the fixed position of the body is predetermined, both operations require relatively short motion. Moreover, this method of individually controlling the said operations per poultry body is suitable for being included in a system in which a plurality of poultry bodies are treated simultaneously in a group and in which other operations of the proper cleaning are equally conducted for all the bodies of the group.

For carrying out the said movements the sensing means and the cleaning tool according to the invention, respectively, may be connected to a common drive means arranged to transmit said first and said second motion in series to the sensing means and the cleaning tool, respectively. A simple embodiment of this drive means may according to the invention comprise a fluidum driven piston-cylinder unit having a predetermined impact length within which the piston and the cylinder are relatively movable, the piston being motion-transmittingly connected to the sensing means or the cleaning tool, and the cylinder being motion-transmittingly connected to the cleaning tool or the sensing means, respectively. A preferred embodiment which is simple and easy to maintain may according to the invention provide that the sensing means and the cleaning tool are pivotally hinged in a vertical plane to one end of a respective, upright and rigid suspension means at its other end pivotally suspended, and that the fluidum driven piston-cylinder unit is disposed so that the piston of the unit is hinged to one, and the cylinder of the unit is hinged to the other suspension means in points between the aforementioned joints.

According to the invention the sensing means may be connected to a releasable locking mechanism arranged to retain the sensing means in engagement with the collar bone of the poultry body so that the sensed geometrical identification of the length of the body is maintained during introduction of the cleaning tool in the body.

To ensure the correct position of the poultry body the fixing mechanism according to the invention for releasably fixing the body in a predetermined position may include a retaining means for releasably retaining the poultry body in a predetermined position and for embracing the chest of the body, said retaining means being connected to a releasable locking mechanism.

This locking mechanism may according to the invention be a common means for the sensing means and the retaining means. However, by engagement of the sensing means with the collar bone the poultry body may be exposed to a certain pressure in the area of the collar bone. To prevent this pressure from impeding removal of the intestines or giblets located adjacent the collar bone, particularly the craw, the sensing means according to the invention may be arranged for movement from the engaged position without release of the locking mechanism. This will relieve or eliminate the pressure and thus allow the cleaning tool, after the sensed geometrical identification of the length of the body and without being interfered by a pressure, to conduct an appropriate cleaning of the poultry body retained by the retaining means, e.g. at its tail head.

According to the invention the cleaning tool may be connected to a releasable blocking mechanism arranged to block movement of the tool until the said first movement of the sensing means is completed. This means that movement of the cleaning tool is automatically started when the sensing means has geometrically identified the length of the poultry body by engagement with the collar bone of the body.

The movement of the cleaning tool may according to the invention be link guided to be made in a circling motion in a vertical plane inwardly and downwardly and then upwardly and outwardly so as to provide efficient cleaning in a simple way.

According to the invention the blocking mechanism may be integral with a part of the guideway to allow the latter to start its guiding operation when the cleaning tool comes out of engagement with the blocking mechanism.

Use of this invention thus provides a simple and safe way of conducting an individual geometrical identification of the length of the poultry body together with an individual adjustment of the cleaning operation. This is also obtainable in case the apparatus is arranged for common cleaning of a group of poultry bodies by providing for each body a sensing means and a cleaning tool. However, according to the invention each group of elements: guideways of the cleaning tools, locking mechanism of the sensing means and retaining means as well as a mechanism for removing the sensing means from the bodies may be arranged for common operational movements, thereby allowing the combined construction of the apparatus to be particularly simple.

The invention will be explained in detail below with reference to the drawing in which FIG. 1 is a schematic representation of the operation of an embodiment of the apparatus according to the invention, and FIG. 2 is a perspective view of parts of that apparatus.

The apparatus comprises a support 1 arranged to receive a poultry body A lying on its back and at its tail head B by a strap 2 fixed to the support 1 in a predetermined position with respect thereto. Such fixing is appropriate because the cross section of the tail head is substantially invariable regardless of the size of the poultry, thereby permitting fixing of the tail head by a single fastening means without any kind of adaption of the fastening force responsive to the size of the poultry.

Moreover, the poultry is securely retained in the area of the greatest operational forces during the cleaning process, at the same time allowing the cleaning tool to be moved into and out of the poultry body without colliding with the fastening means.

A cleaning tool 3 formed as a shovel or a spoon is movable through section C of the poultry abdomen into and out of the abdomen for loosening and extracting intestines and giblets. Cooperating with the cleaning tool 3 is a sensing means 4 which is movable for sensing the length of the poultry body to provide careful and thorough cleaning.

The sensing means 4 is arranged to be moved in a first movement along the neck end of the poultry into engagement with the collar bone (clavicle) D of the body. For this purpose, the sensing means 4 is by means of a pivotal bearing 4a disposed on a slide 4b which is displaceable along a lever 5 swingable about a stationary bearing 6 and from there extending toward the poultry body A in the longitudinal direction of the body and at its free end carrying a retaining means 7 arranged so as by downward oscillation of the lever 5 in a vertical plane to embrace the chest of the body A as the sensing means conducts a sensing operation. The retaining means 7 is open at its end facing the bearing 6 allowing the sensing means 4 to be moved forward into engagement with the collar bone D of the body.

The slide 4b is displaceable along the lever 5 by means of a guide 8 of the parallelogram type which by a pivotal bearing 9 is movably suspended in a vertical plane at the lower end of a rigid lever 10 depending from a stationary bearing 11. The guide 8 includes a releasable locking mechanism 12 in the form of two arms 14 and 15 swingable about a common stationary shaft 13 and both by means of slots 14a and 15a displaceable in their longitudinal direction with respect to the shaft 13. The arm 14 is a bell crank lever suspended by the pivotal bearing 9 in the lever 10 and at its left end by means of a pivotal bearing 14b hinged to a connecting arm 15b which at its right end by a bearing 15c is hinged to the arm 15 and at its left end by a bearing 15d is hinged to the slide 4b. The arms 14 and 15 can be locked in their displaced position by means of a pressure cylinder 16 exerting a fastening pressure effective in direction of the axis of the shaft.

The cleaning tool 3 is disposed at the end of a two-armed lever 17 facing the section C of the body A and pivotal in a vertical plane by means of a bearing 18 suspended in the lower end of rigid lever 19 which at its upper end is suspended in a bearing 20 on a lever 21. Moreover, the lever 17 is by means of a cylinder unit 22 pivotal about its longitudinal axis. At the left end of the lever 17 is disposed a follower roll 23 engaging the bottom surface of a straight guideway 24. This guideway is integral with a blocking mechanism in the form of a recessed section 25 which is downwardly open. The lever 17 is pivotal in a vertical plane about the bearing 18 by means of a fluidum controlled piston-cylinder unit 26 partly connected with the lever 19 and partly with the left end of the lever 17.

The lever 21 is pivotal in a vertical plane about a stationary bearing 28 by means of a fluidum controlled piston-cylinder unit 29 which through a piston rod 29a is connected with an auxiliary arm 29b of the lever 21. The arm 29b carries a cam follower 29c which by means of the unit 29 is movable along a guideway 29d.

Between their joints 9 and 11 as well as 18 and 20, respectively, the levers 10 and 19, respectively, are hinged to a common motion aggregate in the form of a fluidum driven piston-cylinder unit 30 whose piston 31 in the subject embodiment by a linkage 32 is connected with the lever 10 and whose cylinder 33 by a connecting rod 34 and a linkage 35 is connected with the lever 19. The unit 30 has a predetermined impact length within which the piston 31 and the cylinder 33 are relatively movable. A stop rod 36 attached to the connecting rod 34 and cooperating with a stationary stop 37 provides precaution against excessive displacement of the connecting rod resulting in tearing of the intestines at the end of the cleaning operation by extracting the entrails too far.

The sensing means 4 is pivotal about the bearing 4a by means of a stationary piston-cylinder unit 38.

The operation of the apparatus is as follows:

The starting position in a cleaning operation is that the poultry body A is positioned on the support 1 having its tail head B fixed in the strap 2. The lever 19 is pivoted to the left so that the follower roll 23 engages the recess 25 and is retained there by a suitable blocking pressure from the unit 26. The retaining means 7, the sensing means 4 and the locking mechanism 12 adopt the position shown in FIG. 1.

The cylinder unit 22 has turned the lever 17 so as to orient the cleaning tool 3 vertically for movement into the abdomen section C of the poultry body.

The unit 30 is then operated. The motion of the lever 19 being blocked by the follower roll 23 resting in the recess 25, only the lever 10 is operated as the piston 31 by supply of pressure fluidum 39 is drawn to the left providing partial clockwise oscillation of the lever 10. By means of the guide 8 the lever 5 is lowered, and at the same time the sensing means 4 is moved along the neck end of the poultry body in direction toward and into engagement with the collar bone of the body, the retaining means 7 is operated to embrace the chest of the poultry, and the arms 14 and 15 of the locking mechanism 12 change their relative position by displacement in the slots 14a and 15a. The piston-cylinder unit 38 is idling.

When the sensing means 4 engages the collar bone, the length of the particular poultry body is geometrically identified. The pressure cylinder 16 of the locking mechanism 12 is actuated so as to lock the arms 14 and 15 as well as the lever 10. The piston unit 38 is lowered to lift the sensing means 4 about the pivotal bearing 4a in order to relieve or even completely eliminate the pressure of the poultry body on the intestines to be removed. Continuous supply of pressure fluidum 39 to the unit 30 then results in the cylinder casing 33 being drawn to the right, the blocking pressure on the follower roll 23 being adjusted to now allow release of said roll from the recess. The lever 19 is then pivoted a little to the right so that the follower roll 23 is first moved along the guideway 24 and then out of engagement therewith. Then the units 26 and 29 are actuated so as to move the bearings 18 and 20 in paths shown in dotted lines 27a, 27b and to move the cleaning tool 3 by oscillation, partly of the lever 17 and partly of the lever 19, into and out of the poultry body in a circling motion in a vertical plane guiding the cleaning tool inwardly and downwardly as indicated by a dotted line 40, i.e. toward the back of the poultry body, leaving the lungs to be extracted later, and carefully below the liver and gall bladder and then in a collecting movement upwards toward the stomach side and out of the body with the intestines etc. hanging on the tool 3.

The impact length of the unit 33 being predetermined and part of the impact length being used for advancing the sensing means 4 toward the collar bone of the poultry body, the depth of introduction of the tool 3 is automatically determined by the remaining impact length of the unit. Thus, for a short poultry body a relatively great part of the impact length is used for sensing and consequently a correspondingly small part for cleaning, whereas for a long poultry body a relatively small part of the impact length is used for sensing while automatically in turn a correspondingly great part of the impact length is used for cleaning the relatively long body. This means that the paths of movement indicated by the lines 27a and 27b will vary according to the size of the poultry body.

Upon complete introduction in the poultry body the tool 3 is moved by the units 26 and 29 upwardly and outwardly as described. The pressure cylinder 16 is relieved thereby releasing the locking mechanism 12. The lever 10 is returned anti-clockwise thereby displacing the arm 15 to provide engagement of the bottom of its slot 15a with the shaft 13 and causing the lever 5 with the retaining means 7 as well as the sensing means 4 by means of the guide 8 to be lifted into their starting position.

The described apparatus is suitable for simultaneously cleaning a group of poultry bodies, e.g. eight bodies in a series, a retaining means 7, a sensing means 4 and a cleaning tool 3 comprising the said operational means being provided for each body. With the poultry bodies fixed on a support in a predetermined position, e.g. as initially described at their tail heads using corresponding, in series disposed straps, the bodies will protrude differently according to their individual size. The bodies may then be identified according to their lengths and cleaned as described above, the operational movements provided by the unit 30 may be individual for each poultry body while the operations provided by the units 29 and 38 as well as the locking mechanisms 12 may be commonly controlled for the whole group.

In the example mentioned, it is presumed that the support means for the poultry bodies is stationary. However, the arrangement may also visualize that the sensing means as a detail of the sensing operation displaces the bodies against a stop, the cleaning tool being thereafter activated to carry out the cleaning operation.

I claim:

1. Apparatus for automatic cleaning of killed poultry, particularly broilers, and having a support (1) arranged to receive a poultry, a fixing mechanism (2) acting with the support (1) for releasably fixing the poultry in a predetermined position with respect to the support (1), a cleaning tool (3) movable into and out of the abdomen of the poultry body for loosening and extracting intestines and giblets, and a movable sensing means (4) acting with the cleaning tool (3) for identifying the length of the body, characterized in that the sensing means (4) is arranged to be moved in a first motion along the neck end of the body into engagement with the collar bone (clavicle) of the body, that the cleaning tool (3) is arranged to be moved in a second motion into the body, and that the total length of both motions is a constant.

2. Apparatus according to claim 1, characterized in that the sensing means (4) and the cleaning tool (3), respectively, are connected to a common drive means (30) arranged to transmit said first and said second motion in series to the sensing means (4) and the cleaning tool (3), respectively.

3. Apparatus according to claim 2, characterized in that the drive means (30) comprises a fluidum driven piston-cylinder unit having a predetermined impact length within which the piston (31) and the cylinder (33) are relatively movable, the piston (31) being motion-transmittingly connected to the sensing means (4) or the cleaning tool (3), and the cylinder (33) being motion-transmittingly connected to the cleaning tool (3) or the sensing means (4), respectively.

4. Apparatus according to claim 3, characterized in that the sensing means (4) and the cleaning tool (3) are pivotally hinged in a vertical plane to one end of a respective, upright and rigid suspension means (10 and 19) at its other end pivotally suspended, and that the fluidum driven piston-cylinder unit (30) is disposed so that the piston (31) of the unit is hinged to one, and the cylinder (33) of the unit is hinged to the other suspension means (10 and 19) in points between the aforementioned joints (9, 11 or 18, 20).

5. Apparatus according to claim 1, characterized in that the sensing means (4) is connected to a releasable locking mechanism (12) arranged to retain the sensing means (4) in engagement with the collar bone of the body.

6. Apparatus according to claim 1, characterized in that the fixing mechanism includes a retaining means (7) for releasably retaining the poultry body in a predetermined position and for embracing the chest of the body, said retaining means (7) being connected to a releasable locking mechanism (12).

7. Apparatus according to claim 6, characterized in that the locking mechanism (12) is a common means for the sensing means (4) and the retaining means (7), and that the sensing means (4) is arranged for movement from the engaged position without release of the locking mechanism (12).

8. Apparatus according to claim 1, characterized in that the cleaning tool (3) is connected to a releasable blocking mechanism (25) arranged to block movement of the tool (3) until the said first movement of the sensing means (4) is completed.

9. Apparatus according to claim 1, characterized in that the movement of the cleaning tool (3) is cam guided (29c, 29d) to be made in a circling motion in a vertical plane inwardly and downwardly and then upwardly and outwardly.

10. Apparatus according to claim 9, characterized in that the blocking mechanism (25) is integral with a part (24) of the guideway.

11. Apparatus according to claim 1, suitable for common cleaning of a group of poultry bodies and providing a sensing means (4) and a cleaning means (3) for each body, characterized in that each group of elements: guideways (29c, 29d) of the cleaning tools, locking mechanism (12) of the sensing means (4) and the retaining means (7), and a unit (38) for removing the sensing means (4) from the bodies, are arranged for common operational movements.

* * * * *